(12) United States Patent
Choi

(10) Patent No.: US 6,648,797 B2
(45) Date of Patent: Nov. 18, 2003

(54) ENGINE CONTROL METHOD FOR REDUCING EMISSIONS DURING COLD START AND IDLING FOR VEHICLE

(75) Inventor: Myung-Sik Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/150,710

(22) Filed: May 17, 2002

(65) Prior Publication Data

US 2002/0174852 A1 Nov. 28, 2002

(30) Foreign Application Priority Data

May 23, 2001 (KR) .......................... 2001-28295

(51) Int. Cl.[7] .......................... F16H 59/74; F16H 61/26
(52) U.S. Cl. .......................... 477/100; 477/158
(58) Field of Search .......................... 477/100, 158, 477/163

(56) References Cited

U.S. PATENT DOCUMENTS 5,405,303 A * 4/1995 Takada et al. .............. 477/163
5,873,803 A * 2/1999 Geon .......................... 477/158
5,875,761 A * 3/1999 Fujieda et al. .............. 123/399
6,122,582 A * 9/2000 Ueda .......................... 701/51

FOREIGN PATENT DOCUMENTS

KR  10-0302786  7/2001

* cited by examiner

Primary Examiner—Dirk Wright
(74) Attorney, Agent, or Firm—Pennie & Edmonds LLP

(57) ABSTRACT

An engine control method for reducing emissions during cold start and idling is provided, which includes: opening an ISA with a predetermined opening rate such that an air/fuel ratio becomes higher than a stoichiometric air/fuel ratio, and minimizing an engine load caused by an automatic transmission; performing air/fuel ratio control and ignition timing control based on engine speed and engine load, and controlling an amount of fuel injected in consideration of a quantity of wetting fuel; and determining an air flow rate according to an engine speed and coolant temperature, and performing air/fuel ratio control and ignition timing control to control an engine speed fluctuation.

19 Claims, 4 Drawing Sheets

ENGINE CONTROL METHOD FOR REDUCING EMISSIONS DURING COLD START AND IDLING FOR VEHICLE

FIELD OF THE INVENTION

The present invention relates to an engine control method for a vehicle, and more particularly, to a method for reducing hydrocarbon emissions during cold start and engine idling.

BACKGROUND OF THE INVENTION

Generally, a vehicle engine is controlled on the basis of the driving state, an amount of injected fuel, an amount of intake air, ignition timing, and the like. These control processes are performed according to a predetermined control logic by comparing signals of various sensors with data stored in an ECU (Electronic Control Unit).

A typical idle control method is illustrated in FIG. 2. According to such a method, if an ignition switch is turned on, the ECU detects an engine speed n and an engine load L and then calculates the idle speed actuator (ISA) open position therewith using a predetermined table. The ISA is opened to the calculated opening rate (S210). The engine speed n and the engine load L can be acquired from signals from the throttle position sensor and the crankshaft position sensor.

While the engine is operating under the calculated ISA open position, the ECU determines whether the engine speed is higher than a predetermined speed K (S220). If the engine speed is higher than the predetermined speed K, the procedure enters into an idle mode (S230). If the engine speed is not higher than the predetermined speed K, the procedure returns to step S210 where the ECU further regulates the ISA open position.

After step S230, the ECU calculates the air flow rate using the engine speed n and the coolant temperature T (S240). The ECU calculates the air/fuel ratio and the ignition timing using the engine speed n and the engine load L (S250 and S260). The ECU then determines whether the shift range is a neutral range or a parking range (S270). If it is determined that the shift range is the neutral range or the parking range, the ECU determines whether present engine speed is equal to a predetermined engine idle speed, the predetermined engine idle speed being determined by the coolant temperature T (S280).

If it is determined that the present engine speed is not equal to the predetermined engine speed in step S280, the procedure returns to step S240. If it is determined that the shift range is neither the neutral range nor the parking range but in a driving range in step S270, the ECU terminates the idle mode control and starts a D-range-mode control (S290).

In an engine control method as described above, feedback control is performed such that the engine speed approaches the predetermined idle speed. Engine speed is constantly monitored and controlled because as the engine warms up and friction resistance decreases, the initial ISA setting may cause the engine to idle too fast. There is, however, a limitation to the accurate control of the amount of air intake and idle speed using the ISA. Thus air/fuel ratio control and the ignition timing control are also used for more accurate engine control.

The air/fuel ratio control and ignition timing control are also changed because the amount of ISA air intake fluctuates and if the ignition timing is retarded during the cold idle state to decrease the time required to activate the catalytic converter, it is difficult to precisely control the engine. Emissions therefore increase. Further, as the engine speed increases, the ISA is controlled in such a manner that the amount of intake air is decreased. Therefore, it becomes difficult to decrease the time period for activating the catalytic converter.

SUMMARY OF THE INVENTION

The present invention provides an engine control method for decreasing hydrocarbon emissions during cold start and engine idling by retarding the ignition timing and controlling the engine to idle under a lean air/fuel ratio, and controlling the amount of injected fuel according to a suitable quantity of wetting fuel. In accordance with the present invention, the engine is cranked under a leaner air/fuel ratio than a stoichiometric air/fuel ratio by maximizing the amount of intake air in the early stage of the engine starting, and minimizing the engine load caused by an automatic transmission.

The quantity of wetting fuel is preferably calculated based on the number of power strokes of a specific cylinder and the total number of power strokes of the engine that have an effect on temperature of the specific cylinder. After starting, for a certain time period, idle speed is regulated by ignition timing in a state such that a maximum amount of intake air is secured.

In one embodiment, the engine control method according to the present invention comprises opening the ISA to a predetermined open position such that an air/fuel ratio becomes higher (leaner) than a stoichiometric air/fuel ratio, and minimizing engine load from the automatic transmission. The air/fuel ratio and ignition timing are controlled based on engine speed and engine load, and the amount of injected fuel is controlled based on the quantity of wetting fuel. The air flow rate is determined according to engine speed and coolant temperature. Air/fuel ratio and ignition timing are then controlled in order to control engine speed fluctuation based on engine speed and engine load.

According to a further preferred embodiment, the ISA is fully opened and the engine load due to the automatic transmission is minimized by controlling line pressure in the automatic transmission such that no line pressure is generated. Then the air/fuel ratio is set at a value higher than a stoichiometric air/fuel ratio, ignition timing control is performed, and the amount of fuel injected is controlled based on the quantity of wetting fuel that is determined in consideration of the number of power strokes in a specific cylinder and the total number of power strokes of a specific engine.

Air flow rate is calculated based on the engine speed and coolant temperature, simultaneously the ISA is fully opened and the air/fuel ratio and ignition timing are controlled based on engine speed and engine load. A series of determinations are made as to whether the engine speed is equal to a predetermined idle speed, whether the shift range is a neutral range or a parking range, if it is determined that the engine speed is not equal to the predetermined idle speed, and whether the elapsed time from the moment when the ignition switch is turned on is less than a predetermined time, if the shift range is the neutral range or the parking range.

The ISA is fully opened if it is determined that the elapsed time from the moment the ignition switch is turned on is less than the predetermined time. Additionally, it is determined whether a change in engine speed is greater than a predetermined critical speed change.

If the change in engine speed is greater than the predetermined critical speed change, engine speed fluctuation is controlled according to air/fuel ratio control and ignition timing control. If the change in engine speed is not greater than the predetermined critical speed change, the engine speed fluctuation is controlled according to ignition timing control alone.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanied drawings.

Figure 1:
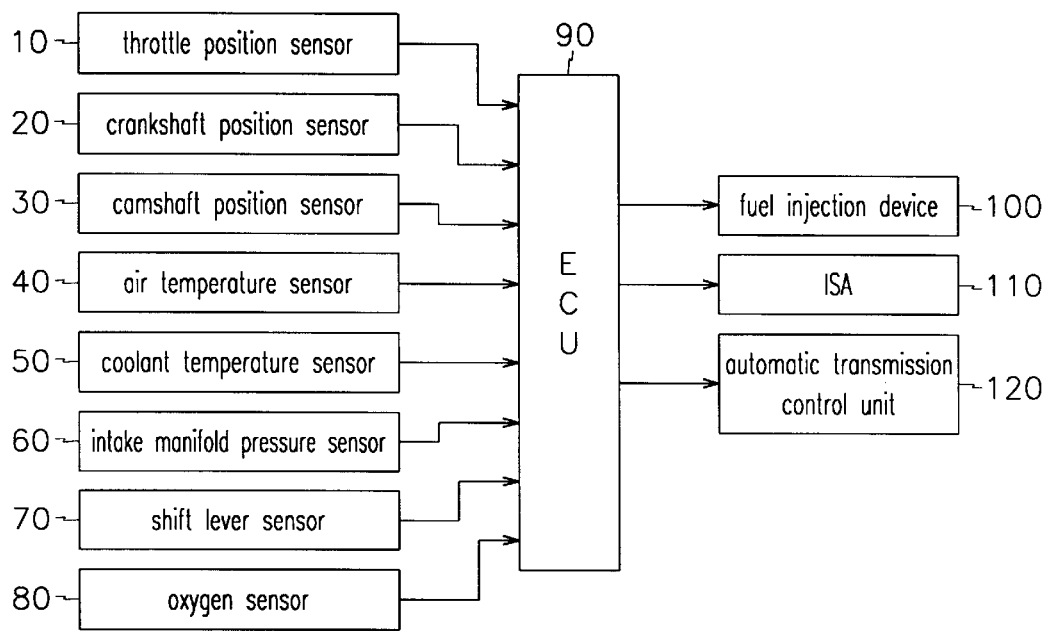
FIG. 1 is a block diagram of an engine control system according to the present invention.
Figure 2:
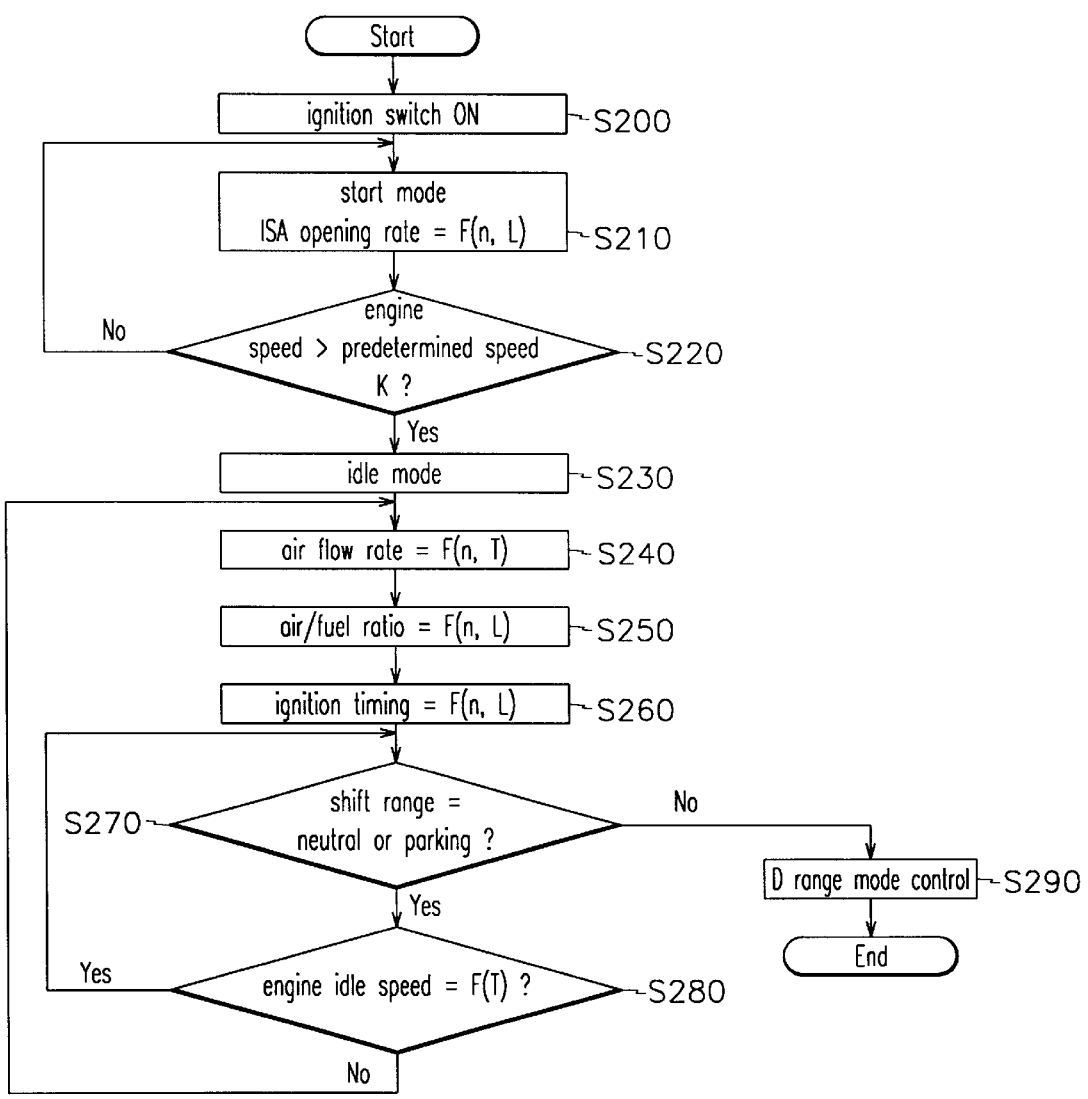
FIG. 2 is a flowchart showing an engine control method according to the prior art.

An engine control system according to the present invention as shown in FIG. 1, comprises sensing members 10 to 80, each detecting specific engine/driving conditions and generating corresponding signals. An electronic control unit (ECU) 90 receives signals from the sensing members and controls various actuators according to a predetermined control logic such that the engine is operated in an optimal state. The engine and drive train of a vehicle employing the present invention are generally conventional and are not described herein.

The sensing members preferably comprise a throttle position sensor 10 detecting the position of the throttle valve, a crankshaft position sensor 20 detecting the angular displacement and rotational speed of the crankshaft, a camshaft position sensor 30 detecting the angular displacement of the camshaft, an air temperature sensor 40 detecting temperature of air supplied through the intake manifold, a coolant temperature sensor 50 detecting coolant temperature, an intake manifold pressure sensor 60 detecting pressure in the intake manifold, a shift lever sensor 70 detecting the selected shift range, and an oxygen sensor 80 detecting an amount of oxygen in the exhaust system.

Figure 3A:
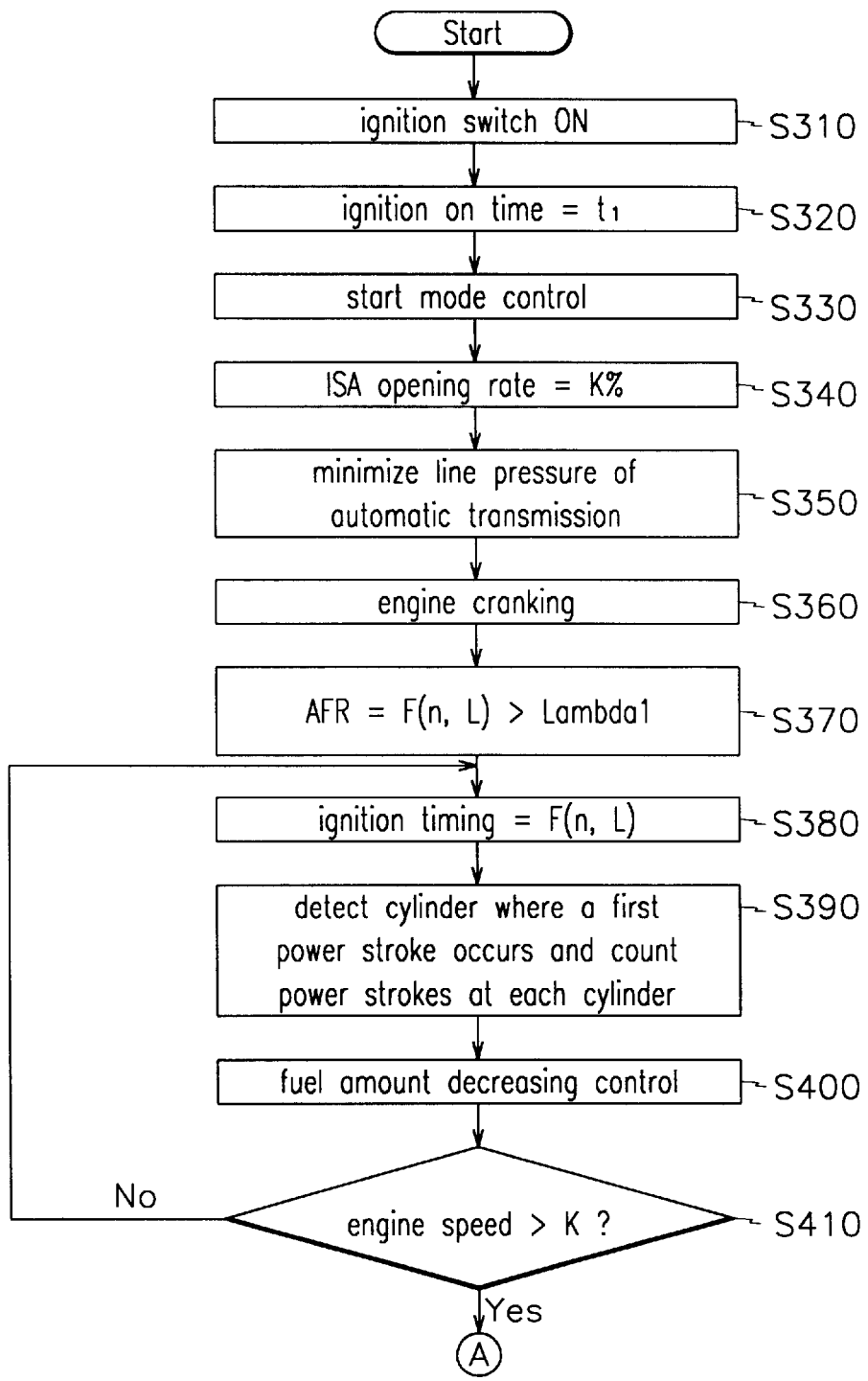
FIGS. 3a and 3b are flowcharts showing an engine control method according to the present invention.
Figure 3B:
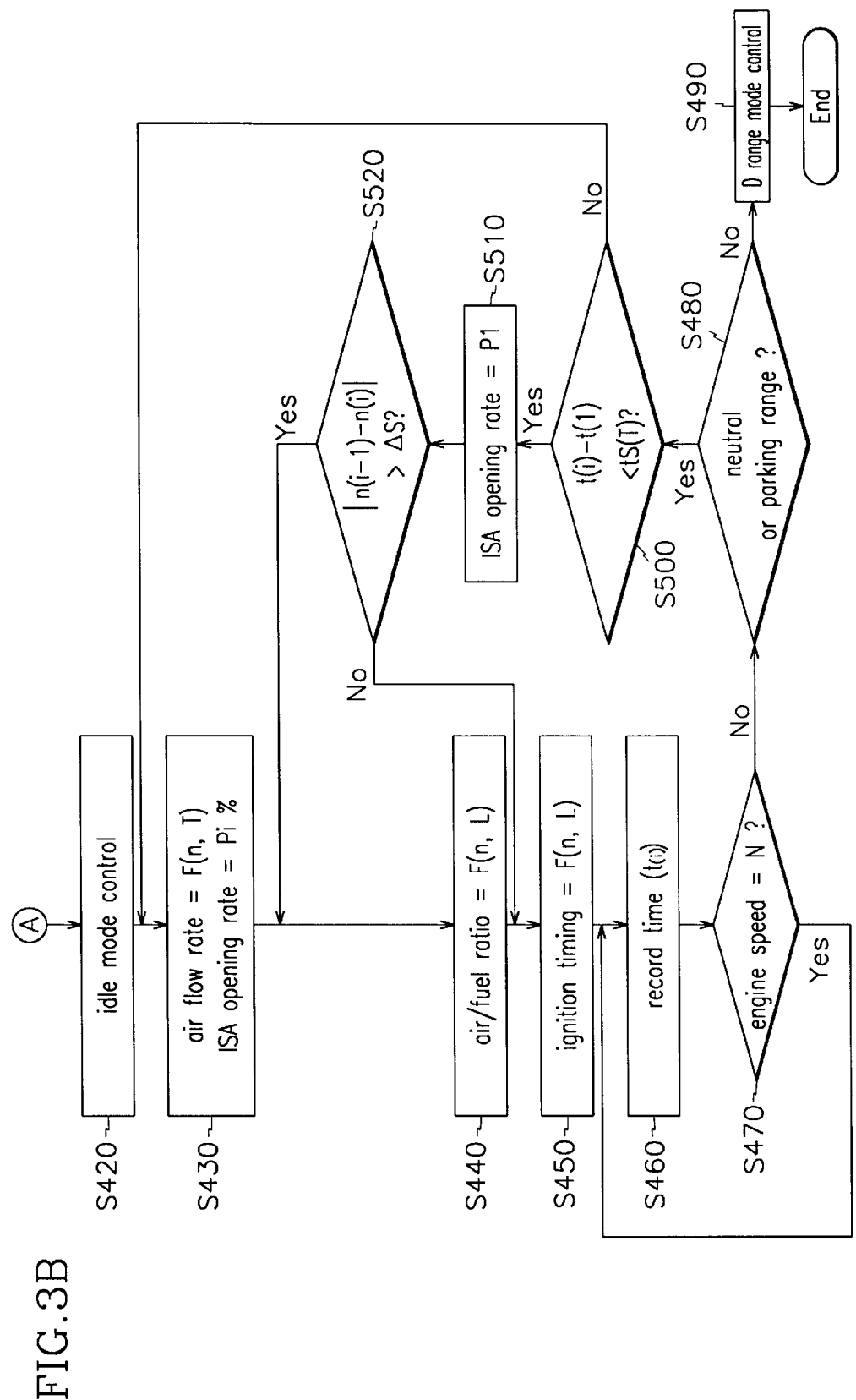

Receiving various signals from the above sensors, the ECU 90 controls the engine to be in an optimal state by controlling the amount of intake air, the amount of injected fuel, the ignition timing and the like. Fuel injection control is generally performed by controlling an actuator of a fuel injection device 100. Idle control is generally performed by controlling an idle speed actuator (hereinafter referred to as an ISA) 110. The engine control system of the present invention may also comprise an automatic transmission control unit 120, which controls the transmission in a conventional manner Referring to FIGS. 3a and 3b, an engine control method according to the invention may be considered in two parts, e.g., start-mode control and idle-mode control. When the ignition switch is turned on (S310), the ignition switch-on time is recorded (S320), and the procedure enters into start-mode control (S330).

The ECU sets the ISA position at percentage of fully open, indicated as K %. (S340). Preferably the amount of intake air is controlled such that the engine starts to rotate at an air/fuel ratio higher than a stoichiometric air/fuel ratio. Therefore, the K % at step S340 is preferably set as 100 or a value proximate to 100.

In a vehicle using a conventional automatic transmission, as the engine starts to rotate, rotational force of the engine is transmitted to an input shaft of the automatic transmission through a torque converter. An oil pump is operated so that line pressure to the transmission is generated, thereby increasing the engine load. Therefore, if the line pressure is not generated, the engine load can be decreased. By operating the solenoid valve that controls the regulator valve of the automatic transmission, generation of line pressure can be avoided. Thus, according to a preferred embodiment of the invention, at step S350, engine load is minimized before the start motor operates so that the engine can start to rotate at a lean air/fuel ratio.

After step S350, the engine starts to crank (S360), and the ECU then calculates an engine speed n and an engine load L, and controls the air/fuel ratio (AFR) according to a predetermined control logic (S370). The air/fuel ratio AFR is determined as a function of the engine speed n and the engine load L. Preferably, the air/fuel ratio can be determined using a predetermined chart of the engine speed n and the engine load L. If the engine starts at an air/fuel ratio higher than the stoichiometric air/fuel ratio, the hydrocarbon emissions decrease. Therefore, the air/fuel ratio is controlled to be higher than the stoichiometric air/fuel ratio.

The air/fuel ratio AFR of step S370 changes according to whether step S350 is performed or not, because the air/fuel ratio is affected by the engine load. After the control of the air/fuel ratio in step S370, the ECU controls the ignition timing according to the engine speed n and the engine load L. The ignition timing is retarded as much as possible within a range in which a predetermined engine speed is maintained (S380).

After the control of the air/fuel ratio and the ignition timing in steps S370 and S380, the ECU determines in which cylinder the first power stroke occurs on the basis of signals from the crankshaft position sensor 20. The ECU also counts power strokes at each cylinder (S390). The number of power strokes in a specific cylinder is acquired by detecting the angular acceleration of the crankshaft and counting the number of times the specific cylinder is in power stroke. A specific cylinder is in power stroke if the detected angular acceleration is larger than a predetermined acceleration that corresponds generally to firing of the piston.

After step S390, the amount of injected fuel is controlled to be preferably below a calculated wetting fuel value for given engine conditions in order to optimize combustion and fuel consumption. (S400). The wetting fuel value is calculated using the number of power strokes of a specific cylinder and total power strokes of the engine, an intake manifold pressure, an air temperature, a coolant temperature, and an engine speed.

The number of power strokes of the specific cylinder and the total number of power strokes are considered in calculation of the wetting fuel value because the former affects the temperature of the specific cylinder and the latter also affects the temperature of the cylinder through heat transfer to the specific cylinder. These have a close relation with the amount of hydrocarbon emissions. More specifically, a large amount of fuel is injected in the early state of engine start-up, considering the amount of fuel wetting the cylinder wall in a cold state. The amount of injected fuel is gradually decreased as the specific cylinder warms and the fuel is able to evaporate, no longer wetting the cylinder wall, thereby being available to be efficiently burned. However, an excessive amount of injected fuel, in consideration of the wetting of the engine, causes an increase in hydrocarbon emissions, and conversely, if the fuel is insufficiently provided, startability decreases and hydrocarbon emissions also increase.

If the wetting fuel value is determined considering the number of power strokes of the specific cylinder and the total number of power strokes of the engine that affect the temperature of the cylinder, the problems of excessive hydrocarbon emissions and decreased startability may be resolved.

If a decrease in the amount of injected fuel is performed in step S400 using the wetting fuel value, the engine starts at a lean air/fuel ratio. The ECU then detects the engine speed, and determines whether the detected engine speed is higher than a predetermined speed K (S410).

If it is determined that the present engine speed is higher than the predetermined speed K, the procedure enters into an idle-mode control (S420), and if it is determined that the present engine speed is not higher than the predetermined speed K, the procedure returns to step S380.

At step S430, the ECU determines the air flow rate according to a changed engine speed and a changed coolant temperature, and controls the ISA open position to be $P_i\%$. The ISA position $P_i\%$ is an initial ISA open position, set at 100%, such that a sufficient amount of intake air is supplied to the engine.

After step S430, the ECU controls the air/fuel ratio on the basis of the engine speed n and the engine load L (S440). Ignition timing is also controlled on the basis of the engine speed n and the engine load L (S450).

After the air/fuel ratio control and the ignition timing control, the engine speed changes. The ECU records an initial time t(i) from the start point when the ignition timing control is initiated (S460), and then determines whether the engine speed is equal to a predetermined speed N (S470). The predetermined speed N is a target engine speed of the idle state.

If it is determined that the engine speed is equal to the predetermined speed N, the procedure returns to step S460. If it is determined that the engine speed is not equal to the predetermined speed N, the ECU determines if the shift range is in the neutral range or the parking range (S480).

If it is determined that the shift lever is not in the neutral or parking range, but in a driving D range in step S480, the procedure enters into a drive mode. In the drive mode, the ECU performs a conventional D-range-mode control (S490), and the procedure then ends.

If it is determined that the shift range is in the neutral or parking range in step S480, the ECU calculates an elapsed time from the engine start using the time t(i) recorded in step S460. It is then determined whether the elapsed time from the engine start is smaller than predetermined time ts(T) (S500). If it is determined that the elapsed time is not smaller than the predetermined time, the procedure returns to step S430.

The predetermined time is determined based on the coolant temperature T. The elapsed time from the engine start is calculated by subtracting the time t(1) detected in step S320 from the time t(i) recorded in step S460 where the variable i has 1 added to it whenever the engine speed is equal to the predetermined speed N.

If it is determined that the elapsed time from the engine start is less than the predetermined time in step S500, the ECU resets the ISA position with the initial open position $P_i$ such that the ISA position maintains the value determined in step S430 (S510). The ECU determines whether the engine speed difference between the present speed n(i) and the latest engine speed n(i−1) is greater than a predetermined speed change (S520). The predetermined speed change is set as a speed change that can be controlled by the ignition timing control alone.

If it is determined that the engine speed difference is not greater than the predetermined speed change in step S520, the procedure returns to step S450 where the ECU performs the ignition timing control on the basis of engine speed and engine load. In this case, the ISA position and the air/fuel ratio are maintained regardless of the change of the engine load. If it is determined that the engine speed difference is greater than the predetermined speed change in step S520, the procedure returns to step S430.

When the engine speed fluctuation is controlled by regulating the ISA position, the intake air amount dramatically changes so that the air/fuel ratio and the ignition timing also dramatically change and thereby the time for activating the catalytic converter becomes increased. Consequently, general idle control is performed when lambda closed loop control is possible. However, if the lambda closed loop control is not possible, the engine speed fluctuation that can be controlled by the ignition timing control alone is controlled by the ignition timing with the ISA fully opened.

If the engine speed difference strays from the predetermined speed change that can be controlled by the ignition timing control alone, the ECU controls the air/fuel ratio such that the engine speed fluctuation enters into the range where the engine speed fluctuation can be once again controlled by the ignition timing control alone.

As stated above, by maximizing the intake air amount in the early stages of engine start-up and minimizing the engine load, the engine control method and apparatus according to the present invention controls the engine to be cranked at an air/fuel ratio leaner than the stoichiometric air/fuel ratio such that the total hydrocarbon (THC) emissions can be minimized.

Further, the fuel injection amount decreasing control is performed considering the number of power strokes of the specific cylinder and the total number of power strokes of the engine that affect the temperature of the cylinder so that the hydrocarbon emissions can be decreased.

What is claimed is:

1. An engine control method for reducing hydrocarbon emissions during cold start and idling, the method comprising:

opening an ISA to a predetermined open position rate such that an air/fuel ratio becomes higher than a stoichiometric air/fuel ratio;

minimizing an engine load caused by an automatic transmission;

initially controlling air/fuel ratio and ignition timing based on engine speed and engine load;

controlling an amount of injected fuel based on a calculated wetting fuel value;

determining an air flow rate according to engine speed and coolant temperature; and controlling air/fuel ratio and ignition timing to control engine speed fluctuation.

2. The engine control method of claim 1, wherein the predetermined open position of the ISA is set as a maximum value such that the ISA is fully opened and thereby an engine is able to be started at an air/fuel ratio higher than the stoichiometric air/fuel ratio.

3. The engine control method of claim 1, wherein the engine load caused by the automatic transmission is minimized by controlling line pressure in the automatic transmission such that pressure is not generated before a start motor operates.

4. The engine control method of claim 1, wherein the air/fuel ratio is initially controlled to be maintained higher than the stoichiometric air/fuel ratio.

5. The engine control method of claim 1, wherein the wetting fuel value is calculated based on a number of power strokes in a specific cylinder and a total number of power strokes of the engine.

6. The engine control method of claim 5, wherein the wetting fuel value is calculated based further on an intake manifold pressure, an air temperature, a coolant temperature and the engine speed in addition to the number of power strokes in the specific cylinder and the total number of power strokes.

7. The engine control method of claim 5, wherein the number of power strokes of the specific cylinder is acquired by determining which cylinder is in a power stroke and counting a number of times when the specific cylinder is in a power stroke, if an angular acceleration of a crankshaft is larger than a predetermined acceleration.

8. The engine control method of claim 1, wherein said engine speed fluctuation comprises:

determining if an elapsed time from the moment when an ignition switch is turned on is smaller than a predetermined time;

fully opening the ISA if it is determined that the elapsed time from the moment the ignition switch is turned on is less than the predetermined time;

determining if a change in engine speed is greater than a predetermined critical speed change; and controlling engine speed fluctuation based on air/fuel ratio and ignition timing if the change in the engine speed is greater than the predetermined critical speed change, and controlling engine speed fluctuation based on the ignition timing if the change in the engine speed is not greater than the predetermined critical speed change.

9. The engine control method of claim 8, wherein the predetermined time is determined according to the coolant temperature.

10. The engine control method of claim 8, wherein the predetermined critical speed change is determined as a maximum value below which the engine speed fluctuation can be controlled by ignition timing control.

11. The engine control method of claim 8, further comprising:

determining if an engine speed is equal to a predetermined idle speed;

determining if a shift lever is located in a neutral or parking range if it is determined that the engine speed is not equal to the predetermined idle speed; and controlling the engine according to a driving range mode if it is determined that the shift lever is located neither in the neutral nor the parking range but in a driving range.

12. The engine control method of claim 8, further comprising:

determining the air flow rate according to the engine speed and the coolant temperature, and performing the air/fuel ratio control and the ignition timing control so as to control the engine speed fluctuation.

13. An engine control method for reducing hydrocarbon emissions during cold start and idling, the method comprising:

(a) fully opening an ISA, and minimizing an engine load caused by an automatic transmission by controlling a line pressure of the automatic transmission such that it is not generated;

(b) setting an air/fuel ratio as a value higher than a stoichiometric air/fuel ratio, performing ignition timing control, and controlling an amount of fuel injected based on a wetting fuel value that is determined in consideration of a number of power strokes in a specific cylinder and a total number of power strokes of a specific engine;

(c) calculating an air flow rate based on an engine speed and a coolant temperature, and simultaneously fully opening the ISA, and performing air/fuel ratio control and ignition timing control based on engine speed and engine load;

(d) determining if the engine speed is equal to a predetermined idle speed;

(e) determining if a shift range is a neutral range or a parking range, if it is determined that the engine speed is not equal to the predetermined idle speed;

(f) determining if an elapsed time from the moment when an ignition switch is turned on is less than a predetermined time, if the shift range is the neutral range or the parking range;

(g) fully opening the ISA if it is determined that the elapsed time from the moment the ignition switch is turned on is less than the predetermined time;

(h) determining if a change in engine speed is greater than a predetermined critical speed change; and (i) controlling an engine speed fluctuation according to air/fuel ratio control and ignition timing control if the change in engine speed is greater than the predetermined critical speed change, and controlling the engine speed fluctuation according to ignition timing control if the change in engine speed is not greater than the predetermined critical speed change.

14. The engine control method of claim 13 wherein in step (b), the wetting fuel value is determined considering an intake manifold pressure, an air temperature, a coolant temperature and the engine speed in addition to the number of power strokes in the specific cylinder and the total number of power strokes.

15. The engine control method of claim 13 wherein in step (b), the number of power strokes of the specific cylinder is acquired by determining which cylinder is in a power stroke and counting a number of times when the specific cylinder is in a power stroke, if an angular acceleration of a crankshaft is larger than a predetermined acceleration.

16. The engine control method of claim 13 wherein a time of the moment when the ignition switch is turned on is recorded in step (a), and a time of a moment when the ignition timing control is performed is recorded in step (c), and the elapsed time from the moment the ignition switch is turned on of step (g) is obtained as a difference between the two recorded times.

17. The engine control method of claim 13, further comprising a step of controlling an engine according to a driving range mode, if it is determined that the shift range is neither the neutral range nor the parking range but the driving range in step (f).

18. The engine control method of claim 13 wherein in step (h), the predetermined critical speed change is determined as a maximum value below which the engine speed fluctuation can be controlled by ignition timing control.

19. The engine control method of claim 13, if it is determined that the elapsed time from the moment when the engine starts is greater than the predetermined critical time in step (g), further comprising a step of determining an air flow rate based on engine speed and engine load, and controlling an engine speed fluctuation by controlling the air/fuel ratio and ignition timing.

* * * * *